(12) United States Patent
Fleischer et al.

(10) Patent No.: US 9,104,532 B2
(45) Date of Patent: Aug. 11, 2015

(54) SEQUENTIAL LOCATION ACCESSES IN AN ACTIVE MEMORY DEVICE

(71) Applicant: International Business Machines Corporation, Armonk, NY (US)

(72) Inventors: Bruce M. Fleischer, Bedford Hills, NY (US); Thomas W. Fox, Hopewell Junction, NY (US); Hans M. Jacobson, White Plains, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 13/714,724

(22) Filed: Dec. 14, 2012

(65) Prior Publication Data

US 2014/0173224 A1    Jun. 19, 2014

(51) Int. Cl.
   *G06F 12/00*    (2006.01)
   *G06F 17/30*    (2006.01)
   *G06F 7/00*     (2006.01)

(52) U.S. Cl.
   CPC ....................................... *G06F 12/00* (2013.01)

(58) Field of Classification Search
   None
   See application file for complete search history.

(56) References Cited

U.S. PATENT DOCUMENTS

| | | | |
|---|---|---|---|
| 6,192,461 B1 * | 2/2001 | Williamson et al. | 712/23 |
| 6,324,643 B1 * | 11/2001 | Krishnan et al. | 712/237 |
| 6,356,997 B1 * | 3/2002 | Krishnan et al. | 712/237 |
| 6,499,085 B2 | 12/2002 | Bogin et al. | |
| 6,772,325 B1 * | 8/2004 | Irie et al. | 712/238 |
| 7,254,699 B2 | 8/2007 | Shepherd | |
| 7,421,561 B2 | 9/2008 | Williams et al. | |
| 7,441,110 B1 * | 10/2008 | Puzak et al. | 712/237 |
| 7,779,198 B2 | 8/2010 | Hutson | |
| 7,783,860 B2 | 8/2010 | Luick et al. | |
| 7,844,797 B2 | 11/2010 | Senter et al. | |
| 8,024,552 B2 | 9/2011 | Jeong et al. | |
| 8,140,756 B2 | 3/2012 | Gai et al. | |
| 8,171,464 B2 | 5/2012 | Eichenberger et al. | |
| 2001/0008009 A1 * | 7/2001 | Johnson | 711/128 |
| 2001/0042155 A1 * | 11/2001 | Nameki | 711/100 |
| 2002/0194430 A1 * | 12/2002 | Cho | 711/118 |

(Continued)

FOREIGN PATENT DOCUMENTS

WO    2008042297 A2    4/2008

OTHER PUBLICATIONS

International Search Report and Written Opinion of the ISA dated Mar. 13, 2014—International Application No. PCT/CN2013/088089.

(Continued)

*Primary Examiner* — Daniel Bernard
(74) *Attorney, Agent, or Firm* — Cantor Colburn LLP

(57) ABSTRACT

Embodiments relate to sequential location accesses in an active memory device that includes memory and a processing element. An aspect includes a method for sequential location accesses that includes receiving from the memory a first group of data values associated with a queue entry at the processing element. A tag value associated with the queue entry and specifying a position from which to extract a first subset of the data values is read. The queue entry is populated with the first subset of the data values starting at the position specified by the tag value. The processing element determines whether a second subset of the data values in the first group of data values is associated with a subsequent queue entry, and populates a portion of the subsequent queue entry with the second subset of the data values.

20 Claims, 7 Drawing Sheets

(56) References Cited

U.S. PATENT DOCUMENTS

| | | | |
|---|---|---|---|
| 2003/0028749 A1* | 2/2003 | Ishikawa et al. | 711/220 |
| 2003/0196044 A1* | 10/2003 | Ramirez et al. | 711/137 |
| 2004/0044848 A1* | 3/2004 | Katayama | 711/125 |
| 2004/0208066 A1* | 10/2004 | Burky et al. | 365/200 |
| 2005/0177672 A1* | 8/2005 | Rao | 711/3 |
| 2005/0198442 A1* | 9/2005 | Mandler | 711/145 |
| 2005/0246508 A1* | 11/2005 | Shaw | 711/157 |
| 2006/0179225 A1* | 8/2006 | Wester et al. | 711/125 |
| 2006/0282621 A1* | 12/2006 | Moyer | 711/141 |
| 2007/0001812 A1* | 1/2007 | Powell | 375/240 |
| 2007/0226462 A1* | 9/2007 | Scott et al. | 712/207 |
| 2008/0077763 A1* | 3/2008 | Steinmetz et al. | 711/170 |
| 2008/0082794 A1* | 4/2008 | Yu et al. | 712/218 |
| 2009/0013132 A1* | 1/2009 | Kurd | 711/125 |
| 2010/0077173 A1* | 3/2010 | Rao et al. | 711/170 |
| 2010/0332698 A1* | 12/2010 | Muller | 710/57 |
| 2012/0036512 A1 | 2/2012 | Chung et al. | |
| 2012/0079200 A1 | 3/2012 | Dally | |
| 2014/0025892 A1* | 1/2014 | Williams, III | 711/122 |

OTHER PUBLICATIONS ip.com et al., "A Method to Detect and Prevent Memory Overwrites Across the Memory Chunks Allocated Within the Process Heap Area," IPCOM000196346OD, May 31, 2010, 7 pages.

S. Saha, et al., "CombiHeader: Minimizing the Number of Shim Headers in Redundancy Elimination Systems," 14th IEEE Global Internet Symposium, Apr. 10-15, 2011, pp. 798-803.

A. Lebeck, et al., "Request combining in multiprocessors with arbitrary interconnection networks," IEEE Trans. Parallel Distrib. Sys. (USA), vol. 5, No. 11, 1994, pp. 1140-1155.

S. Kaxiras, et al., "Improving Request-Combining for Widely Shared Data in Shared-Memory Multiprocessors," Euromicro MPCS, Apr. 1998, 11 pages.

* cited by examiner

FIG. 6

| N | L | Group 0 Beat 0 Start | Group 0 Beat 0 Length | Group 0 Beat 1 Start | Group 0 Beat 1 Length | Group 1 Beat 0 Start | Group 1 Beat 0 Length | Group 1 Beat 1 Start | Group 1 Beat 1 Length | Group 2 Beat 0 Start | Group 2 Beat 0 Length | Group 2 Beat 1 Start | Group 2 Beat 1 Length |
|---|---|---|---|---|---|---|---|---|---|---|---|---|---|
| 1 | 16 | 0 | 8 | | | | | | | | | | |
| 2 | | | 8 | 0 | 8 | | | | | | | | |
| 3 | | 16-L | L-8 | 0 | 8 | 0 | 8 | | | | | | |
| 1 | 8 | | | | | | | | | | | | |
| 2 | | | 8 | 0 | 8 | | | | | | | | |
| 3 | | 16-L | L-8 | 0 | 8 | 0 | 8 | | | | | | |
| 1 | 16<L<8 | 16-L | L-8 | | | 0 | 16-L | | | | | | |
| 2 | | 16-L | L-8 | | | 0 | 16-L | L-8 | L | | | | |
| 3 | | 8-L | L | | | 0 | 8-L | L | L | | | | |
| 1 | 8<L<0 | | | | | 8-L | L | 0 | 8-L | 0 | 8-L | | |
| 2 | | | | | | 8-L | L | 0 | 8-L | 0 | 8-L | | |
| 3 | | | | | | | | | | | | | |

600 ↗

← 602
← 604
← 606
← 608

SEQUENTIAL LOCATION ACCESSES IN AN ACTIVE MEMORY DEVICE

BACKGROUND

The present invention relates generally to computer memory, and more particularly to sequential location accesses in an active memory device.

Computer systems often require a considerable amount of high speed memory, such as random access memory (RAM), to hold information, such as data and programs, when a computer is powered and operational. Memory device demands have continued to grow as computer systems have increased performance and complexity.

In a typical main memory application, a main processor specifies an address and either requests reading of the contents of memory or requests that the memory location is overwritten with contents that the main processor specifies. Communication from the main processor to locations on memory devices can involve relatively long data access times and latency. The time it takes for the main processor to access memory can be, for example, several hundred cycles, including time to realize the data is not in cache (for memory reads), time to traverse from a processor core of the main processor to I/O, across a module or other packaging, arbitration time to establish a channel to memory in a multi-processor/shared memory system, and time to get the data into or out of a memory cell.

SUMMARY

Exemplary embodiments include a method for sequential location accesses in an active memory device that includes memory and a processing element. The method includes receiving from the memory a first group of data values associated with a queue entry at the processing element. A tag value associated with the queue entry is read. The tag value specifies a position from which to extract a first subset of the data values. The queue entry is populated with the first subset of the data values starting at the position in the first group of data values specified by the tag value. The processing element determines whether a second subset of the data values in the first group of data values is associated with a subsequent queue entry. Based on determining that the second subset of the data values in the first group of data values is associated with the subsequent queue entry, a portion of the subsequent queue entry is populated with the second subset of the data values.

Additional exemplary embodiments include a processing element of an active memory device. The processing element includes a load store queue configured to interface with memory in the active memory device and memory access logic configured to manage load store queue entries of the load store queue. The processing element also includes one or more load store units configured to provide information to the memory access logic to populate the load store queue entries. The processing element is configured to perform a method that includes receiving from the memory a first group of data values associated with a queue entry at the processing element. A tag value associated with the queue entry is read. The tag value specifies a position from which to extract a first subset of the data values. The queue entry is populated with the first subset of the data values starting at the position in the first group of data values specified by the tag value. The processing element determines whether a second subset of the data values in the first group of data values is associated with a subsequent queue entry. Based on determining that the second subset of the data values in the first group of data values is associated with the subsequent queue entry, a portion of the subsequent queue entry is populated with the second subset of the data values.

Further exemplary embodiments include an active memory device. The active memory device includes memory and a processing element configured to communicate with the memory. The processing element is configured to perform a method that includes receiving from the memory a first group of data values associated with a queue entry at the processing element. A tag value associated with the queue entry is read. The tag value specifies a position from which to extract a first subset of the data values. The queue entry is populated with the first subset of the data values starting at the position in the first group of data values specified by the tag value. The processing element determines whether a second subset of the data values in the first group of data values is associated with a subsequent queue entry. Based on determining that the second subset of the data values in the first group of data values is associated with the subsequent queue entry, a portion of the subsequent queue entry is populated with the second subset of the data values.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 6 illustrates different alignment examples for sequential location accesses in an active memory device in accordance with an embodiment.

DETAILED DESCRIPTION

Figure 1:
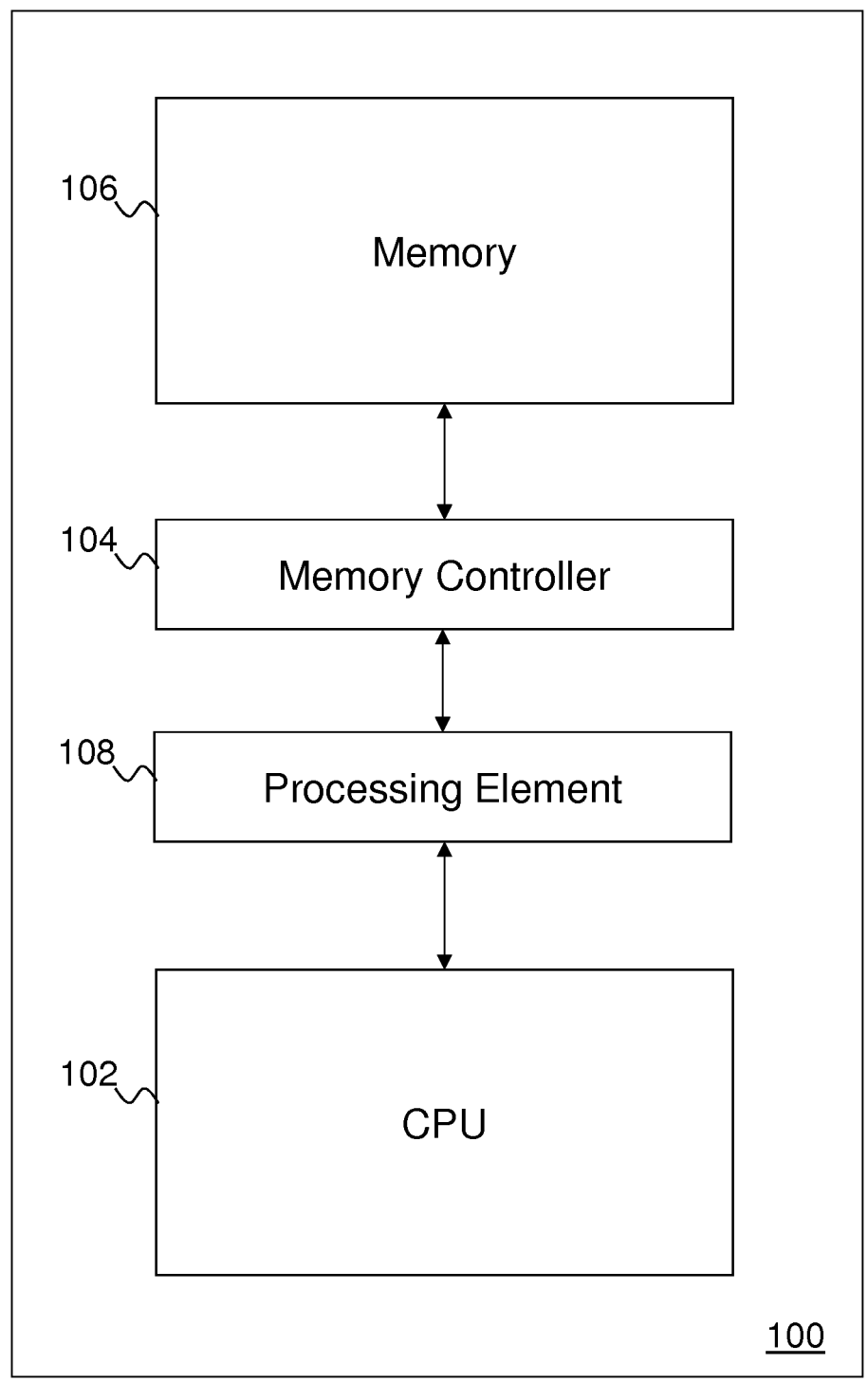
FIG. 1 illustrates a block diagram of a system for active memory in accordance with an embodiment.

To improve memory system bandwidth, a number of locations can be accessed as a unit or group of memory locations per request. However, if an address of a desired group of memory locations is not well aligned to a group boundary of accessed memory locations, e.g., starting near the end of a group, then a second group of memory locations must also be accessed to complete the request. Accessing a number of memory locations that are not desired as part of a memory access request can result in an overall reduction in memory system bandwidth, particularly for large numbers of misaligned memory access requests. Exemplary embodiments handle multiple sequential memory accesses by selectively extracting data values from a group of memory locations and satisfying subsequent sequential accesses by using data values returned from the group of memory locations.

An embodiment is directed to sequential location accesses in an active memory device. The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where three dimensional subsections of the memory device form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements on the active memory device as well as between processing elements and a main processor. Each vault may have an associated memory controller or logic unit that is also coupled to the interconnect network.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector and scalar register files, a plurality of load/store units for the movement of data between memory and the register files, and a plurality of execution units for the arithmetic and logical processing of various data types. Also included in the processing element are address translation capabilities for converting virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-physical address translations that are computed while executing the loaded instructions. In an example, when performing a load instruction, the active memory device accesses an operand from a memory location and places the operand in a register in the processing element. A virtual address of the memory location is generated by the load instruction and is translated into a physical address by the processing element. Similarly, when performing a store instruction, the active memory device writes a memory location with the contents (e.g., an operand) in a register in the processing element. A virtual address of the memory location is generated by the store instruction and is translated into a physical address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands, and read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

FIG. 1 illustrates a block diagram of a system for storing and retrieving data in a memory in accordance with an embodiment. A system 100 depicted in FIG. 1 includes a computer processor (CPU) 102, a memory 106 having memory devices, as well as a memory controller 104 and processing element 108 for receiving and processing data from the computer processor 102 to be stored in the memory 106.

The memory controller 104 may be in communication with the computer processor 102 and receive write requests from the computer processor 102 without using functions of the processing element 108. The write requests contain data to be written to the memory 106 and a physical address for identifying the location in the memory 106 to which the data will be written. The memory controller 104 stores data at a physical address within the memory 106. The computer processor 102 can map the virtual address to a physical address in the memory 106 when storing or retrieving data.

In an embodiment, the processing element 108 is in communication with the computer processor 102 and receives a command from the computer processor 102. The command may correspond to instructions stored in the memory 106. The command may also include a virtual address for identifying the location in the memory 106 to which the data will be written. The memory controller 104 and/or processing element 108 stores data at a physical address within the memory 106. In an embodiment, the processing element 108 maps the virtual address to a physical address in the memory 106 when storing or retrieving data. As described in further detail below, the computer processor 102 provides commands to the memory 106, where the processing element 108 receives the command and fetches corresponding instructions from the memory 106. The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 and/or processing element 108 via a network). In addition, portions of the processing described herein may span one or more of the memory 106, memory controller 104, processing element 108 and computer processor 102.

Figure 2:
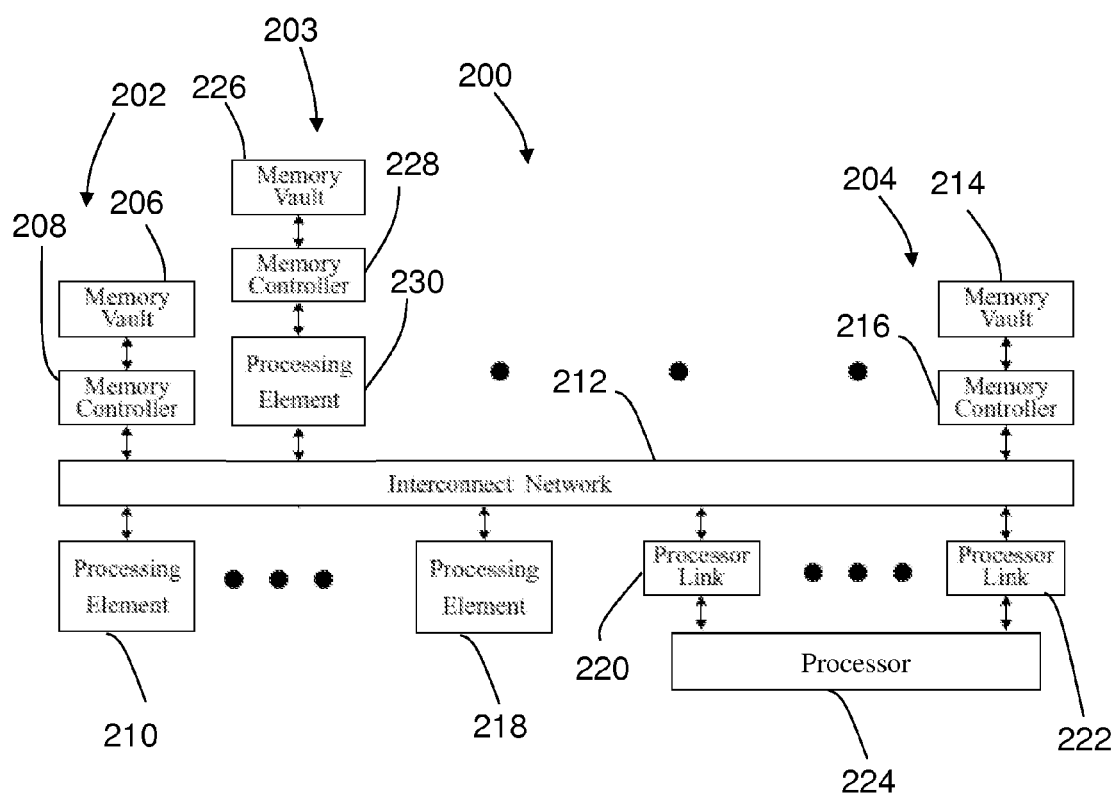
FIG. 2 illustrates a block diagram of a memory system with active memory in accordance with an embodiment.

FIG. 2 is a schematic diagram of an embodiment of a computer system 200 implementing active memory. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such as processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing element 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stacks memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing element, such as processing element 230, is located as part of a stack including a memory vault 226 and memory controller 228. In such a configuration, the processing element 230 is configured to access memory vault 226 without going through the interconnect network 212. The processing element 230 is also coupled to the interconnect network 212 and can access memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

Figure 3:
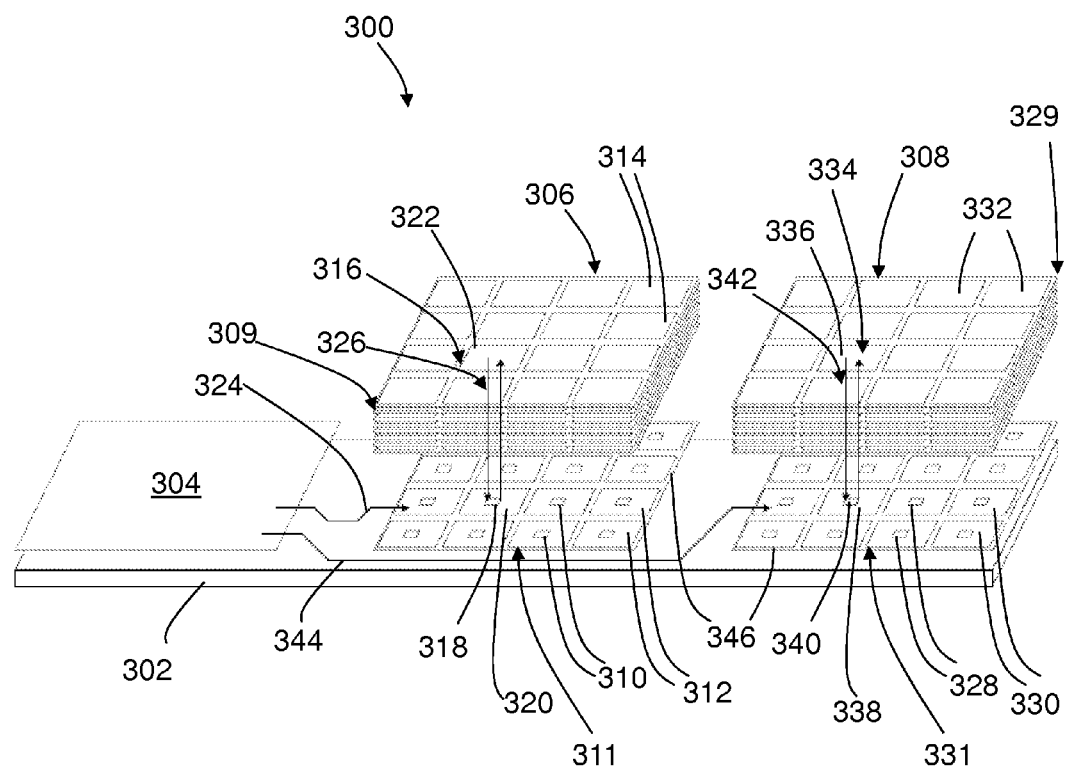
FIG. 3 illustrates a schematic diagram of a memory system with active memory in accordance with an embodiment.

FIG. 3 is a diagram of an exemplary computer system 300 implementing active memory. The computer system 300 includes a circuit board 302, a main processor 304, active memory device 306 and active memory device 308. The active memory device 306, active memory device 308 and main processor 304 are disposed on the circuit board 302. As depicted, portions of the active memory devices 306 and 308 are exploded to show details of the computer system 300 arrangement. The active memory devices 306 and 308 communicate to the main processor 304 via signal paths 324 and 344, respectively. As depicted, the active memory 306 device is arranged in layers, where a base layer 311 includes a plurality of memory controllers 310 and processing elements 312. For example, the active memory device 306 includes layers 309 of memory placed on top of the base layer 311, where the layers 309 each have a plurality of memory elements. As depicted, the base layer 311 also includes an interconnect network 346 to enable high bandwidth communication between memory, memory controllers and processing elements in the device.

In an embodiment, the active memory device 306 includes a plurality of memory vaults 314, where each memory vault 314 includes a memory element from each layer 309, the memory vaults 314 positioned adjacent to memory controllers 310 and processing elements 312. Specifically, the exemplary active memory device 306 includes layers of 16 memory elements, where the element layers form stacks, including a stack 316, where the stack 316 includes a memory vault 322 disposed above a memory controller 318 and a processing element 320. A high bandwidth communication path 326 provides a high bandwidth, direct and substantially reduced length (e.g., as compared to paths 324, 344) communication path between the processing element 320 and memory locations within the memory vault 322, thus reducing latency and power consumption for memory accesses. For example, the processing element 320 may receive a command from the main processor 304, load instructions from within the active memory device 306 based on the command, and, as part of the loaded instructions, access data at a location in the memory vault 314 and perform a complex operation on the data in the processing element 320. Further, the processing element 320 may also store data, such as the result, in the memory vault 314 and transmit a value or signal to the main processor 304 following execution of the command. In an embodiment, the processing element 320 stores or writes data (e.g. an operand) from a register in the processing element 320 to the memory vault 314. The processing element 320 is also configured to translate addresses from virtual-to-real and real-to-virtual as part of the read or store operations. Thus, the processing element 320 provides instruction loading, address translation, complex operations and other tasks local to the memory to reduce latency, save power and free up the main processor 304 to perform other tasks.

Similarly, the active memory device 308 includes a plurality of memory controllers 328 and processing elements 330 disposed on a base layer 331. In an embodiment, the active memory 308 includes layers 329 of memory devices placed on top of the base layer 331, where the layers 329 each have a plurality of memory devices. The base layer 331 also includes an interconnect network 346 to enable high bandwidth communication between memory and processing elements in the device. In an embodiment, the interconnect networks 346 of active memory device 306 and active memory device 308 are coupled and allow communication between processing elements and memory on separate devices.

In an embodiment, the active memory device 308 includes a plurality of memory vaults 332, where each memory vault 332 includes a memory element from each layer 309, the memory vaults 332 are positioned adjacent to memory controllers 328 and processing elements 330. The exemplary active memory device 308 includes 16 stacks, including stack 334, where the stack 334 includes a memory vault 336 disposed above a memory controller 340 and a processing element 338. A high bandwidth communication path 342 provides communication between the processing element 330 and memory locations within the memory vault 336.

Figure 4:
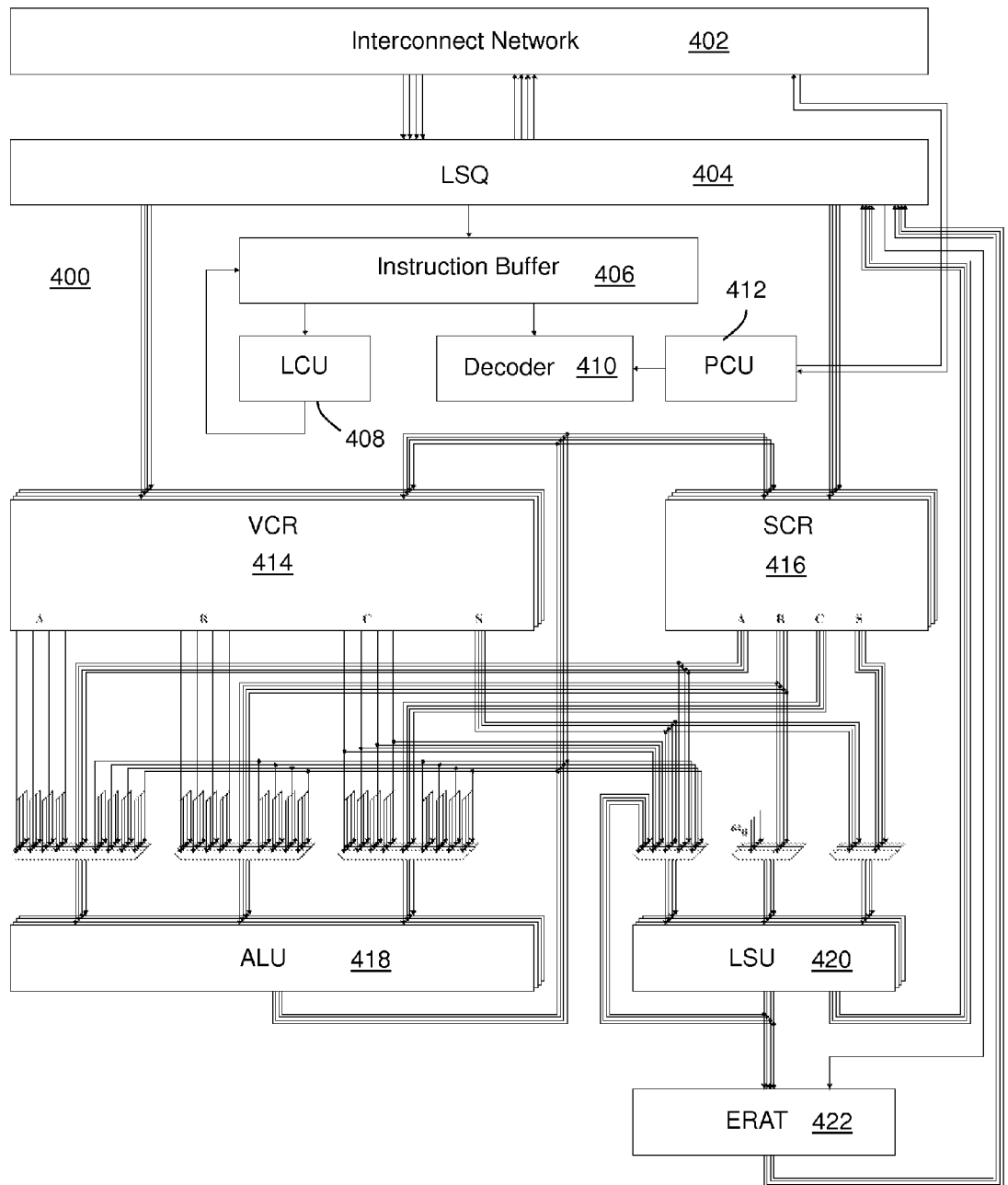
FIG. 4 illustrates a block diagram of a processing element in an active memory device in accordance with an embodiment.

FIG. 4 depicts an example of a processing element 400 coupled to an interconnect network 402 as an embodiment of one of the processing elements of FIGS. 1-3. The processing element 400 is a programmable vector processing element, situated in an active memory device, such as one of the active memory devices of FIGS. 1-3. In the example of FIG. 4, the processing element 400 includes a load-store queue (LSQ) 404 coupled to the interconnect network 402 and to an instruction buffer 406. The instruction buffer 406 is also coupled to a lane control unit (LCU) 408 and a decoder 410. A processor communication unit (PCU) 412 provides a communication interface between the processing element 400 and the main processor or other processing elements through the interconnect network 402. The LSQ 404 is also coupled to a vector computation register file (VCR) 414 and a scalar computation register file (SCR) 416. The VCR 414 and SCR 416 are coupled through multiple multiplexers to an arithmetic logic unit (ALU) 418 and a memory-access unit 420, also referred to as a load-store unit (LSU) 420. The ALU 418 is coupled to itself and to the LSU 420 through multiplexers, and is also coupled to the VCR 414 and the SCR 416. The LSU 420 may also be coupled to itself, to the LSQ 404, to an effective-to-real address translation unit (ERAT) 422 for virtual-to-physical address translation, to the VCR 414 and to the SCR 416 (all connections not depicted). The ERAT 422 is also coupled to the LSQ 404. As will be appreciated, numerous other connections and elements can be included in the processing element 400. For example, connections between the decoder 410 and other elements are not depicted for clarity. Additionally, depicted connections in FIG. 4 can be modified or omitted, such as the depicted connection between decoder 410 and PCU 412.

The processing element 400 supports an instruction set architecture including a broad range of arithmetic capabilities on many data types. Vector processing capabilities of the processing element 400 allows for single instruction, multiple data (SIMD) in time, while SIMD in a spatial dimension is also supported. The instruction buffer 406 holds instructions (also referred to as "lane instructions"), which are fetched and executed in order, subject to branching.

In an embodiment, each lane instruction contains 9 sub-instructions for execution in various units within the processing element 400. An iteration count may be included within the lane instruction, allowing the sub-instructions to be repeated up to a predetermined number of times (e.g., up to 32 times). This facilitates SIMD in time. The LCU 408 can manage the iteration count and determine when to advance to a next instruction or repeat execution of the same instruction. In an embodiment, arithmetic pipelines of ALU 418 are 64 bits wide, and spatial SIMD is supported by virtue of the ability to execute data types smaller than 64 bits in parallel, simultaneously as multiple execution slots. For example, assuming that a lane instruction includes 9 sub-instructions, execution of the sub-instructions can be performed in the LCU 408 for lane control, and in four processing slices, each of which includes an ALU 418 and an LSU 420. Pairs of the VCR 414 and the SCR 416 can be implemented per processing slice and are accessible by each pair of the ALU 418 and LSU 420. Accordingly, the VCR 414, SCR 416, ALU 418, LSU 420, and associated multiplexers are depicted as stacks of four elements to indicate 4 processing slices in the example of FIG. 4.

At the processing slice level, computation can occur on floating-point and fixed-point data types at, for example, a 64-bit granularity in a temporal SIMD manner on 64-bit vector elements, and in a temporal and spatial SIMD manner on narrower vector sub-elements, which can be 32-bits, 16-bits, or 8-bits wide.

Each processing slice within the processing element 400 includes a memory access pipeline (load/store pipeline) and an arithmetic pipeline. Managing flow through the LSU 420 as a load/store pipeline can enable computation of one address per vector data element or sub-element. The processing element 400 provides the ability to perform associated fixed-point effective address (i.e., virtual address) computations. The arithmetic pipeline through the ALU 418 can include a robust assortment of floating-point and fixed-point operations to support a variety of workloads.

The LSU 420 may support load and store operations of, for example, 8, 4, 2 and 1 byte(s) and load and store operations of 4, 2, and 1 byte(s) to and from registers with packed data.

The ALU 418 may support copy operations between register files, arithmetic, rounding and conversion, comparison, and maximum and minimum operations on floating-point data types of double-precision (64 bits) and single-precision (32 bits), and arithmetic, rotate/shift, comparison, logical, count leading zeros, and ones population count operations on fixed-point data types of doubleword (64 bits), word (32 bits), halfword (16 bits) and bytes (8 bits).

In an embodiment, the computational model of a processing slice within the processing element 400 is a vector single instruction multiple data (SIMD) model with the VCR 414 and SCR 416. The VCR 414 can support multiple dimensions of registers, while the SCR 416 supports a single dimension of registers. For example, the VCR 414 can include 16 vector entries with 32 elements each of 64 bits, and the SCR 416 can include 16 register entries with 1 element each of 64 bits, although numerous other configurations may be supported. A variable number of execution slots can be used, operating on an equal number of sub-elements, whereby the sub-elements taken together add up to one register element (either VCR 414 or SCR 416) of 64 bits in this example. The number of execution slots and the corresponding number of vector sub-elements depend upon the data type of the instruction. Examples of data types and sizes of various formats include: floating-point with double-precision (64-bit) and single-precision (32-bit) data types and fixed-point for a doubleword (64-bit), word (32-bit), halfword (16-bit), and byte (8-bit) data types.

Figure 5:
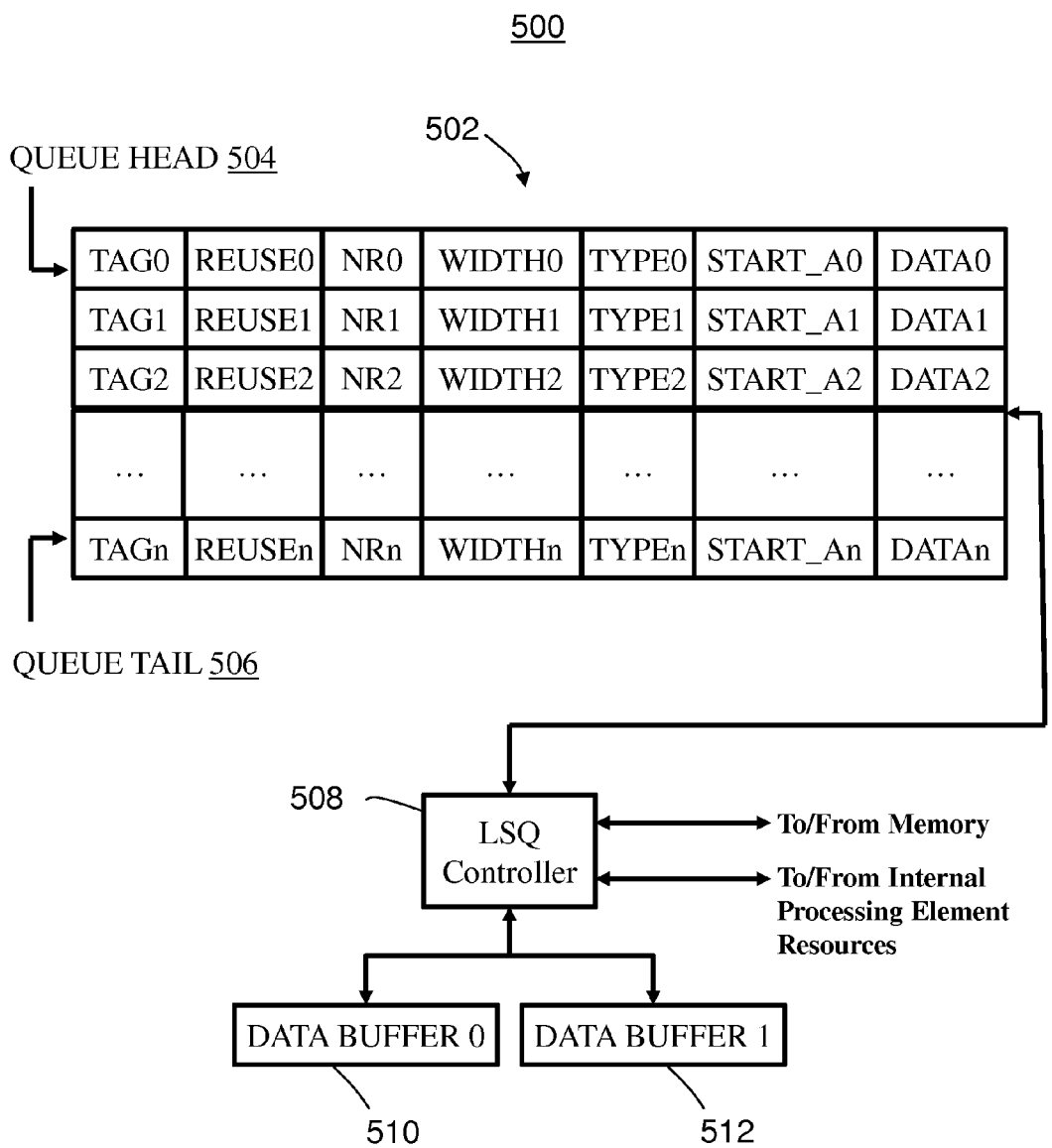
FIG. 5 illustrates an example of memory access logic in a processing element of an active memory device in accordance with an embodiment.

FIG. 5 illustrates an example of memory access logic 500 in a processing element of an active memory device. The memory access logic 500 may be implemented within the LSQ 404 of the processing element 400 of FIG. 4 in one of the active memory devices of FIGS. 1-3. The memory access logic 500 manages a plurality of LSQ entries 502 to queue load and store requests to/from memory of an active memory device. The LSU 420 of FIG. 4 provides information to the memory access logic 500 to form one or more of the LSQ entries 502 per instruction. Each of the LSQ entries 502 can result in one or more memory access requests. LSU data can be received from multiple processing slices and converge in the LSQ 404 such that sequential LSQ entries 502 can be from various processing slices. Accordingly, there can be a multiple cycle delay between the LSU 420 processing an instruction, one or more corresponding entries being written to the LSQ entries 502, sending corresponding memory access requests to the interconnect network 402 of FIG. 4, receiving results from one or more memory vaults, and storing the returned data to corresponding locations in the LSQ entries 502. In exemplary embodiments, the LSU 420 detects a condition in which part or all of the data needed for a current instruction can be provided by data from a group requested by a previous instruction, and if so, which request to issue since the previous instruction will provide data for the current instruction. If the addresses requested by a series of instructions are calculated by adding different multiples of an address offset to a common base address, such as in the execution of vector load-update instructions, this condition can be detected early in a sequence of instructions. More generally, the condition can be detected as each instruction is executed, from the effective address and data size of the current and previous instructions. The LSU 420 sends information to the LSQ 404 that includes bits to encode this condition.

A queue head pointer 504 and queue tail pointer 506 may be used by LSQ controller 508 to track the location of LSQ entries 502 to be serviced. Each of the LSQ entries 502 in the example of FIG. 5 includes a tag value ($tag_0 \ldots tag_n$), a reuse field ($reuse_0 \ldots reuse_n$), a no request field (no $request_0 \ldots$ no $request_n$), a data width ($data\ width_0 \ldots data\ width_n$), an access type ($type_0 \ldots type_n$), a start address ($start\ address_0 \ldots start\ address_n$), and data values ($data_0 \ldots data_n$). The tag values each specify a position in a group of data values from which to extract a subset of the data values to populate data values in the each of the LSQ entries 502. For example, the LSQ controller 508 can issue a read (load) request to memory in an active memory. When the LSQ controller 508 creates an LSQ entry from LSU information, if that LSQ entry can use data requested by an older LSQ entry, re-use information for the older LSQ entry is updated to identify the younger entry in the reuse field. When an LSQ entry is created, a no request field is populated indicating whether or not a memory request is unnecessary (i.e., whether its data will be requested by an older LSQ entry). When an LSQ entry gets its turn to issue a memory access request, the LSQ controller 508 can use the no request field to avoid issuing unnecessary requests.

When the LSQ controller 508 receives a group of data values from memory, the group of data values can be stored temporarily in data buffer zero 510 or data buffer one 512 in the example of FIG. 5. When a data packet is returned to the LSQ 404, it may contain a data payload and metadata. The metadata is used by the LSQ 404 to identify an LSQ entry which gets data from that packet. If more than one LSQ entry gets data from that packet, the metadata identifies the oldest entry, which is the entry that caused the memory request to be issued. The LSQ controller 508 copies data from the packet into the data field of that LSQ entry. The LSQ controller 508 also checks the re-use field for the associated LSQ entry to detect whether at least one additional LSQ entry gets data from the same packet, and if so, which one. If another LSQ entry gets data from that packet, the data needed by that LSQ entry is copied from the oldest LSQ entry, and the re-use field for that LSQ entry is checked. This can be repeated until an LSQ entry is reached with no re-use, and the oldest LSQ entry can be retired.

In an embodiment, each read of memory returns a group of sixteen data values, or bytes, in two beats (8 bytes/beat). Accordingly, each of the data buffers 510, 512 can be sized to hold sixteen data values, such that one group of data values can be written by the LSQ controller 508 while a second group of data values is selectively written to LSQ entries 502. Alternatively, each of the data buffers 510, 512 can hold a separate beat worth of data values (e.g., half of a group of data values). As a further alternative, data buffer one 512 can be omitted, with data buffer zero 510 used for temporary storage.

In the example of FIG. 5, each entry in the LSQ 404 holds one address and generates one memory request, and two LSQ entries are created for an instruction that requests data which crosses a data group boundary in memory. However, it will be understood that each LSQ entry may support more than one memory access request, so an instruction would result in only one LSQ entry even if the data requested crossed a group boundary. In this case, any reference to an actual or possible memory request, by association with an LSQ entry, would need to specify not only an LSQ entry, but one of two requests for that LSQ entry.

In the example of FIG. 5, the data width for each of the LSQ entries 502 is associated with an access request of memory that spans a plurality of locations in the memory. For example, the data width (or data size) can be 8 bytes, while each group of data values received from the memory and stored in one of the data buffers 510, 512 can be 16 bytes. The data width or size for each memory access associated with a queue entry is not limited to a full line of memory (e.g., a full cache line) as it is specified as part of a memory access request. Accordingly, the data size or width in a queue entry can be reconfigured such that it includes additional data associated with one or more subsequent queue entries. The access type can define a load (read) or store (write) access request per LSQ entry 502. The start address for each of the LSQ entries 502 defines a starting address of an access request which may not be aligned with a data group boundary. For example, the starting address of each data group might be a multiple of 16 bytes, while an 8-byte read request could have a starting address at the $4^{th}$ or $12^{th}$ byte of a data group. Additionally, each start address in the LSQ entries 502 may represent upper address bits of a desired memory location and each tag value in the LSQ entries 502 may represent lower address bits of the desired memory location.

In exemplary embodiments, the LSQ controller 508 determines a data width for an LSQ entry where the data width (e.g., data $width_0$) is associated with an access request of memory as defined by an access type (e.g., $type_0$). If the access type is a read (load) access request, the LSQ controller 508 issues a read command to read a group of data values from the memory that includes data values at the associated starting address (e.g., start $address_0$). The tag value (e.g., $tag_0$) can be read to determine a position in the first group of data values from which to extract a subset of the data values. The subset of the data values starting at the position in the first group of data values specified by the tag value is extracted and written to the data value (e.g., $data_0$) of the LSQ entry. For example, a two beat read can result in storing 16 bytes to data buffer zero 510. If data $width_0$ is 8 bytes and $tag_0$ is 4, where the tag value is defined here as a number of bytes from the end of the group, then only the last 4 bytes stored in data buffer zero 510 will be extracted and written into $data_0$. Data can be extracted by bit/byte shifting, selection through read/write/enable signals, or using other methods known in the art. The LSQ controller 508 can determine that an amount of data specified by data $width_0$ (8 bytes) was not fully extracted from the first group of data values in data buffer zero 510, as only 4 bytes of the desired 8 bytes were extracted. When a second group of data values, containing the remaining bytes, arrives, it can be stored in data buffer one 512. The LSQ controller 508 extracts the remaining number of data values from the second group of data values to fully populate the data width associated with the access request, for instance, by extracting the first 4 bytes of the remaining number of data values from the second group of data values to fully populate the data width associated with the access request and writing them to the remaining locations in $data_0$.

As a further example, if data $width_0$ is 8 bytes and $tag_0$ is 10, where the tag value is a number of bytes from the end of the group containing 16 bytes, then all 8 bytes for $data_0$ are extracted with 2 bytes remaining in data buffer zero 510. As previously described, the reuse field in the LSQ entries 502 can be used to determine that data read for the first group will be used to satisfy the second group, and the no request field can be used to avoid issuing one or more memory access requests for an LSQ entry that is populated based on an older LSQ entry rather than by issuing a new memory access request. In this case, the last two bytes of data buffer zero 510 would be extracted and written as the first two bytes of $data_1$. The tag value in $tag_1$ can be read to determine a position in the first group of data values from which to extract a subset of the data values. The LSQ controller 508 determines that the amount of data specified by data $width_1$ (8 bytes) was not fully extracted from the first group of data values in data buffer zero 510, as only 2 bytes of the desired 8 bytes were extracted. When a data packet containing the remaining values for $data_1$ is received from the network, its group of data values can be stored in data buffer one 512. The LSQ controller 508 extracts the remaining number of data values from the second group of data values to fully populate the data width associated with the access request, for instance, by extracting the first 6 bytes of the remaining number of data values from the second group of data values to fully populate the data width associated with the access request and writing them to the remaining locations in $data_1$. The process continues for subsequent access requests such that each access request can leverage data values acquired by a previous access request. If three instructions each load 4 bytes of data, such that data $width_0$, data $width_1$, and data $width_2$ are all 4, and if $tag_0$ is 10, the group of data values returned by the first request will fully populate $data_0$ and $data_1$, and partially populate $data_2$. This data will be returned from a single request, as a result of an LSQ entry associated with the first instruction. No additional requests for data in this group will be generated as a result of LSQ entries associated with the second or third instruction. An LSQ entry associated with the third instruction will result in a request for a second group of data values. When a packet is returned satisfying this request, the first two bytes will complete populating $data_2$.

While the example depicted in FIG. 5 includes a tag value and a data width for each of the LSQ entries 502, a common tag value and data width can be defined for a group of LSQ entries 502 where the values would otherwise be repeated for a plurality of individual LSQ entries 502. Furthermore, tag values can be defined at different levels of granularity. For example, if a group of data values is read as two beats per group, then the tag value can be used to determine a start position and number of bytes to extract (length) per beat. In this example, a first beat would populate a first half of a data buffer, such as data buffer zero 510 or data buffer one 512, and a second beat would populate a second half of the data buffer. Therefore, extraction and writing of data values can be managed on a per beat basis. The example of FIG. 5 is described as if sequential LSQ entries 502 for the same LSU 420 are processed without intervening LSQ entries 502 for other LSUs 420; however, it will be understood that the LSQ entries 502 for each LSU 420 of processing element 400 can be managed to accommodate intervening LSQ entries 502 from various LSUs 420 with sequential access requests from separate LSUs 420 tracked separately.

FIG. 6 illustrates different alignment examples 600 for sequential location accesses in an active memory device. The example of FIG. 6 assumes that 16-byte groups of data values are accessed in two 8-byte beats. "L" in FIG. 6 indicates a number of bytes that can be used from the first group of data values, and "N" is an access request number (first, second, third, etc.) that may align with separate entries in the LSQ entries 502 of FIG. 5. "Start" indicates a position of the first byte from a beat and "length" is the number of bytes used from a beat. In a first alignment example 602, a sequence of three read access requests for three sequential 8-byte reads is illustrated, where "L" is 16. A start address for the first read at N=1 for the first alignment example 602 aligns with a group boundary size of 16. Data values of group0 read can be used to satisfy sequential read accesses for N=1 and N=2. A next group read access for group1 can satisfy a read access for N=3. As can be seen in the first alignment example 602, rather than taking a simpler approach of initiating a separate group read for each access request, data values acquired in a previous group read can be used to fulfill sequential read requests and enhance memory system bandwidth.

In a second alignment example 604, a sequence of three read access requests for three sequential 8-byte reads is illustrated, where "L" is 8. A start address for the first read at N=1 for the second alignment example 604 aligns with a beat boundary size of 8, starting at beat1 of group0. Data values of beat1 of group0 read can be used to satisfy the first read access for N=1. A next group read access for group1 can satisfy second and third read accesses for N=2 and N=3. In the second alignment example 604, two group reads accomplish what would otherwise take three group reads for three read accesses.

In a third alignment example 606, a sequence of three read access requests for three sequential 8-byte reads is illustrated, where "L" is between 8 and 16 exclusive. A start address for the first read at N=1 for the third alignment example 606 does not align with a group boundary or a beat boundary but starts at 16−L in beat0 of group0. A total of L−8 data values of beat0 of group0 can be used to satisfy a first portion of the first read access for N=1. A second portion of the first read access for N=1 is satisfied starting at beat1 of group0 by extracting 16−L bytes. A second read access for N=2 can be satisfied in part by the remaining bytes of beat1 of group0 with the remaining part satisfied by a portion of beat0 of group1. For the second read access for N=2, L−8 bytes of beat1 of group0 are extracted starting at position 16−L, and 16−L bytes are extracted starting at position 0 of beat0 of group1. Similarly, a third read access for N=3 can be satisfied by extracting L−8 bytes of beat0 of group1 starting at position 16−L, and 16−L bytes are extracted starting at position 0 of beat1 of group1.

In a fourth alignment example 608, a sequence of three read access requests for three sequential 8-byte reads is illustrated, where "L" is between 0 and 8 exclusive. A start address for the first read at N=1 for the fourth alignment example 608 does not align with a group boundary or a beat boundary but starts at 8−L in beat1 of group0. A total of L data values of beat1 of group0 can be used to satisfy a first portion of the first read access for N=1. A second portion of the first read access for N=1 is satisfied starting at position 0 of beat0 of group1 and extracting 8−L bytes. A second read access for N=2 can be satisfied in part by the remaining bytes of beat0 of group1 with the remaining part satisfied by a portion of beat1 of group1. For the second read access for N=2, L bytes of beat0 of group1 are extracted starting at position 8−L, and 8−L bytes are extracted starting at position 0 of beat1 of group1. Similarly, a third read access for N=3 can be satisfied by extracting L bytes of beat1 of group1 starting at position 8−L, and 8−L bytes are extracted starting at position 0 of beat0 of group2.

As can be seen by the examples of FIG. 6, exemplary embodiments handle different alignment configurations to minimize the number of requests to memory and hence bandwidth may be improved and power requirements reduced in an active memory device. Exemplary embodiments limit a total number of requests for N sequential access requests to ceil ((N+2)/2), where ceil is a round to the next highest integer function. In contrast, simply initiating separate memory requests for each access request has a limit of ceil (3*N/2) for N sequential access requests.

Figure 7:
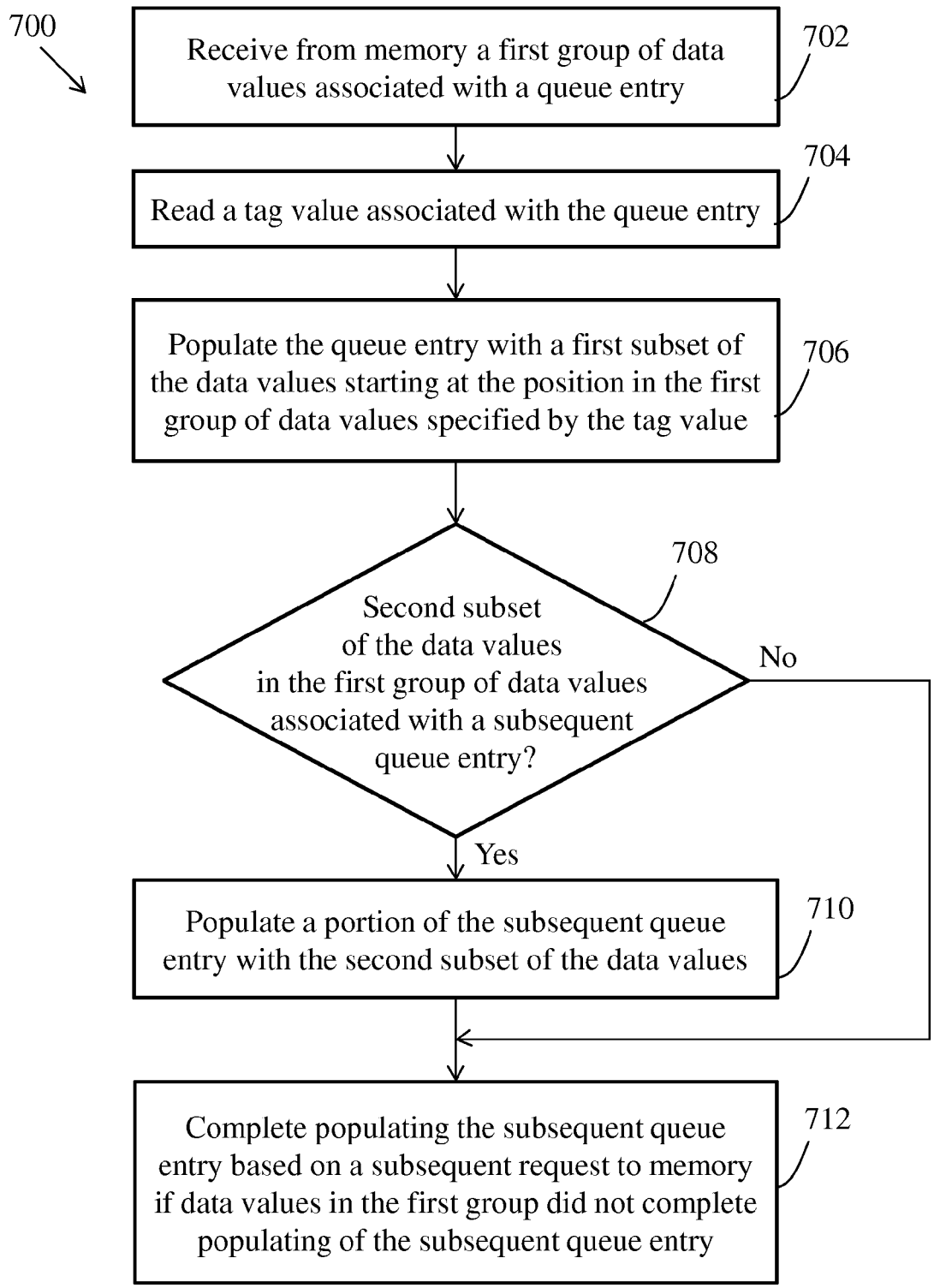
FIG. 7 illustrates a flow diagram of a process for sequential location accesses in an active memory device in accordance with an embodiment.

FIG. 7 is a process 700 for sequential location accesses in an active memory device, such as the active memory devices of FIGS. 1-3. The blocks depicted in FIG. 7 may be performed by one of the processing elements of FIGS. 1-4 in an active memory device. For example, the blocks may be performed by a processing element in an active memory device, where the processing element accesses portions of memory (e.g., memory vaults sharing a stack with the processing element) and performs operations on data accessed from the memory. For purposes of explanation, the processing element is described in reference to processing element 400 of FIG. 4 including an LSU 420, LSQ 404, and memory access logic of FIG. 5. The LSU 420 receives a sequence of instructions to access memory of an active memory device. The memory access logic 500 uses information from the LSU 420 to populate and modify queue entries of the LSQ 404 associated with one or more instructions.

At block 702, the processing element 400 receives from the memory a first group of data values associated with a queue entry of the LSQ 404. At block 704, the memory access logic 500 reads a tag value, such as $tag_0$, associated with the queue entry. The tag value specifies a position from which to extract a first subset of the data values. The position may be defined relative to a group size or a beat size, e.g., half of the group size. At block 706, the memory access logic 500 populates the queue entry with the first subset of the data values starting at the position in the first group of data values specified by the tag value. At block 708, the processing element 400 determines whether a second subset of the data values in the first group of data values is associated with a subsequent queue entry for a sequential location following the first subset of the data values. At block 710, based on determining that the second subset of the data values in the first group of data values is associated with the subsequent queue entry, a portion of the subsequent queue entry is populated with the second subset of the data values. At block 712, the processing element 400 completes populating the subsequent queue entry based on a subsequent request to memory if data values in the first group did not complete populating of the subsequent queue entry.

To support reuse of data associated with previous queue entries and previous instructions, the processing element 400 analyzes an instruction associated with the subsequent queue entry targeting memory locations. Based on determining that a previous instruction associated with the queue entry targets memory locations in common with the instruction, a re-use field in the queue entry is set linking the queue entry to the subsequent queue entry. A data size or width of the queue entry can also be reconfigured to include additional data for the subsequent queue entry. Based on determining that the first group of data values to be accessed based on the previous instruction includes all of the memory locations targeted by the instruction, the subsequent queue entry can be configured to prevent issuing a memory access request associated with the subsequent queue entry, for example, by setting a no-request field in the subsequent queue entry. The queue entry may result in one or more sequential memory access requests to the memory, while the subsequent queue entry can result in no memory access requests to the memory. Based on determining that the first group of data values to be accessed based on the previous instruction does not include all of the memory locations targeted by the instruction, the subsequent queue entry can be configured to request subsequent memory locations in a second group of data values.

Further instructions and further subsequent queue entries can be handled in a similar manner to support linking of many queue entries to support, for example, a vector instruction accessing multiple sequential locations. The processing element 400 may analyze a subsequent instruction associated with a further subsequent queue entry targeting memory locations. Based on determining that the instruction associated with the subsequent queue entry targets memory locations in common with the subsequent instruction, a re-use field can be set in the subsequent queue entry linking the subsequent queue entry to the further subsequent queue entry. A portion of the further subsequent queue entry can be populated with data values received for the subsequent queue entry such as one or more of: a third subset of the data values in the first group of data values, and a subset of data values from a second group of data values associated with the subsequent queue entry.

Technical effects and benefits include handling multiple sequential memory accesses by selectively extracting data values from a group of memory locations and satisfying subsequent sequential accesses by using data values returned from the group of memory locations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for sequential location accesses in an active memory device that includes memory and a processing element, the method comprising:
   receiving from the memory a first group of data values associated with a queue entry at the processing element;
   reading a tag value associated with the queue entry, the tag value specifying a position from which to extract a first subset of the data values;
   populating the queue entry with the first subset of the data values starting at the position in the first group of data values specified by the tag value;
   determining, by the processing element, whether a second subset of the data values in the first group of data values is associated with a subsequent queue entry; and
   based on determining that the second subset of the data values in the first group of data values is associated with the subsequent queue entry, populating a portion of the subsequent queue entry with the second subset of the data values.

2. The method of claim 1, further comprising:
   analyzing a subsequent instruction associated with the subsequent queue entry targeting memory locations; and
   based on determining that a previous instruction associated with the queue entry targets memory locations in common with the subsequent instruction, setting a re-use field in the queue entry linking the queue entry to the subsequent queue entry and reconfiguring a data size of the queue entry to include additional data for the subsequent queue entry.

3. The method of claim 2, further comprising:
   based on determining that the first group of data values to be accessed based on the previous instruction does not include all of the memory locations targeted by the instruction, configuring the subsequent queue entry to request subsequent memory locations in a second group of data values.

4. The method of claim 2, further comprising:
   based on determining that the first group of data values to be accessed based on the previous instruction includes all of the memory locations targeted by the subsequent instruction, configuring the subsequent queue entry to prevent issuing a memory access request associated with the subsequent queue entry.

5. The method of claim 4, wherein configuring the subsequent queue entry to prevent issuing the memory access request associated with the subsequent queue entry comprises setting a no-request field in the subsequent queue entry, and further wherein the queue entry results in one or more sequential memory access requests to the memory and the subsequent queue entry results in no memory access requests to the memory.

6. The method of claim 2, further comprising:
   analyzing a further subsequent instruction associated with a further subsequent queue entry targeting memory locations;
   based on determining that the subsequent instruction associated with the subsequent queue entry targets memory locations in common with the further subsequent instruction, setting a re-use field in the subsequent queue entry linking the subsequent queue entry to the further subsequent queue entry;
   reconfiguring a data size of the queue entry to include additional data for the further subsequent queue entry; and
   populating a portion of the further subsequent queue entry with data values received for the subsequent queue entry.

7. The method of claim 6 wherein the portion of the further subsequent queue entry is populated with one or more of: a third subset of the data values in the first group of data values, and a subset of data values from a second group of data values associated with the subsequent queue entry.

8. A processing element of an active memory device comprising:
   a load store queue configured to interface with memory in the active memory device;
   memory access logic configured to manage load store queue entries of the load store queue; and
   one or more load store units configured to provide information to the memory access logic to populate the load store queue entries, the processing element configured to perform a method comprising:
      receiving from the memory a first group of data values associated with a queue entry at the processing element;
      reading a tag value associated with the queue entry, the tag value specifying a position from which to extract a first subset of the data values;
      populating the queue entry with the first subset of the data values starting at the position in the first group of data values specified by the tag value;
      determining whether a second subset of the data values in the first group of data values is associated with a subsequent queue entry; and
      based on determining that the second subset of the data values in the first group of data values is associated with the subsequent queue entry, populating a portion of the subsequent queue entry with the second subset of the data values.

9. The processing element of claim 8, wherein the processing element is further configured to perform:
   analyzing a subsequent instruction associated with the subsequent queue entry targeting memory locations; and based on determining that a previous instruction associated with the queue entry targets memory locations in common with the subsequent instruction, setting a re-use field in the queue entry linking the queue entry to the subsequent queue entry and reconfiguring a data size of the queue entry to include additional data for the subsequent queue entry.

10. The processing element of claim 9, wherein the processing element is further configured to perform:
based on determining that the first group of data values to be accessed based on the previous instruction does not include all of the memory locations targeted by the instruction, configuring the subsequent queue entry to request subsequent memory locations in a second group of data values.

11. The processing element of claim 9, wherein the processing element is further configured to perform:
analyzing a further subsequent instruction associated with a further subsequent queue entry targeting memory locations;
based on determining that the subsequent instruction associated with the subsequent queue entry targets memory locations in common with the further subsequent instruction, setting a re-use field in the subsequent queue entry linking the subsequent queue entry to the further subsequent queue entry;
reconfiguring a data size of the queue entry to include additional data for the further subsequent queue entry; and
populating a portion of the further subsequent queue entry with one or more of: a third subset of the data values in the first group of data values, and a subset of data values from a second group of data values associated with the subsequent queue entry.

12. The processing element of claim 9, wherein the processing element is further configured to perform:
based on determining that the first group of data values to be accessed based on the previous instruction includes all of the memory locations targeted by the subsequent instruction, configuring the subsequent queue entry to prevent issuing a memory access request associated with the subsequent queue entry.

13. The processing element of claim 12, wherein configuring the subsequent queue entry to prevent issuing the memory access request associated with the subsequent queue entry comprises setting a no-request field in the subsequent queue entry, and further wherein the queue entry results in one or more sequential memory access requests to the memory and the subsequent queue entry results in no memory access requests to the memory.

14. An active memory device comprising:
memory; and
a processing element configured to communicate with the memory, the processing element configured to perform a method comprising:
receiving from the memory a first group of data values associated with a queue entry at the processing element;
reading a tag value associated with the queue entry, the tag value specifying a position from which to extract a first subset of the data values;
populating the queue entry with the first subset of the data values starting at the position in the first group of data values specified by the tag value;
determining whether a second subset of the data values in the first group of data values is associated with a subsequent queue entry; and
based on determining that the second subset of the data values in the first group of data values is associated with the subsequent queue entry, populating a portion of the subsequent queue entry with the second subset of the data values.

15. The active memory device of claim 14, wherein the active memory device is a three-dimensional memory cube, the memory is divided into three-dimensional blocked regions as memory vaults, and accessing multiple locations in the memory is performed through one or more memory controllers in the active memory device.

16. The active memory device of claim 14, wherein the processing element is further configured to perform:
analyzing a subsequent instruction associated with the subsequent queue entry targeting memory locations; and
based on determining that a previous instruction associated with the queue entry targets memory locations in common with the instruction, setting a re-use field in the queue entry linking the queue entry to the subsequent queue entry and reconfiguring a data size of the queue entry to include additional data for the subsequent queue entry.

17. The active memory device of claim 16, wherein the processing element is further configured to perform:
based on determining that the first group of data values to be accessed based on the previous instruction does not include all of the memory locations targeted by the instruction, configuring the subsequent queue entry to request subsequent memory locations in a second group of data values.

18. The active memory device of claim 16, wherein the processing element is further configured to perform:
analyzing a further subsequent instruction associated with a further subsequent queue entry targeting memory locations;
based on determining that the subsequent instruction associated with the subsequent queue entry targets memory locations in common with the further subsequent instruction, setting a re-use field in the subsequent queue entry linking the subsequent queue entry to the further subsequent queue entry;
reconfiguring a data size of the queue entry to include additional data for the further subsequent queue entry; and
populating a portion of the further subsequent queue entry with one or more of: a third subset of the data values in the first group of data values, and a subset of data values from a second group of data values associated with the subsequent queue entry.

19. The active memory device of claim 16, wherein the processing element is further configured to perform:
based on determining that the first group of data values to be accessed based on the previous instruction includes all of the memory locations targeted by the subsequent instruction, configuring the subsequent queue entry to prevent issuing a memory access request associated with the subsequent queue entry.

20. The active memory device of claim 19, wherein configuring the subsequent queue entry to prevent issuing the memory access request associated with the subsequent queue entry comprises setting a no-request field in the subsequent queue entry, and further wherein the queue entry results in one or more sequential memory access requests to the memory and the subsequent queue entry results in no memory access requests to the memory.

* * * * *